United States Patent [19]
Baker et al.

[11] Patent Number: 6,160,701
[45] Date of Patent: Dec. 12, 2000

[54] UNIVERSALLY ACCESSIBLE PORTABLE COMPUTER

[75] Inventors: Gregory Gardner Baker, Los Angeles, Calif.; Howard C. Shane, Chestnut Hill; James Lewis, Newton, both of Mass.; Daniel Kendall Harden, Palo Alto; Ian James Myles, Mountain View, both of Calif.; Garry Ming Heng Goh, Singapore, Singapore; Matthew Allison Herron, Palo Alto, Calif.; John Lyndon Groff, San Jose, Calif.; John Daniell Hebert; Gordon M. Fair, III, both of San Francisco, Calif.; Rex Lundgren; Baldo Faieta, both of San Francisco, Calif.; Henrik Thurfjell, Sunnyvale, Calif.

[73] Assignee: Assistive Technology, Inc., Newton, Mass.

[21] Appl. No.: 09/124,688

[22] Filed: Jul. 29, 1998

Related U.S. Application Data

[63] Continuation of application No. 08/944,160, Oct. 6, 1997, abandoned.
[60] Provisional application No. 60/054,904, Aug. 5, 1997, and provisional application No. 60/061,162, Oct. 6, 1997.

[51] Int. Cl.[7] .............................. H05K 5/00; G06F 15/00; G06F 1/16
[52] U.S. Cl. ......................... 361/683; 361/681; 361/682; 364/705.1; 364/708.1
[58] Field of Search .......................... 361/683, 680–682, 361/684, 685, 686, 687, 724–727; 312/223.1, 223.2; 364/700, 705.1–705.7, 708.1, 709.11, 709.12, 716.01; 345/169, 905

[56] References Cited

U.S. PATENT DOCUMENTS

| | | | |
|---|---|---|---|
| 3,763,479 | 10/1973 | Jebb et al. | 340/172.5 |
| 4,565,999 | 1/1986 | King et al. | 340/706 |
| 4,567,479 | 1/1986 | Boyd | 340/709 |

(List continued on next page.)

FOREIGN PATENT DOCUMENTS

| | | | |
|---|---|---|---|
| 409185662 | 7/1997 | Japan | G06K 7/00 |
| 410011195 | 1/1998 | Japan | G06F 3/02 |

(List continued on next page.)

OTHER PUBLICATIONS

DynaMyte 3100 & DynaVox 3100 Infrared Capabilities http://www.sentient–sys.com/12%203100%20Infrared%20Cap.../12%203100%20Infrared.htm (visited Dec. 16, 1998).

(List continued on next page.)

Primary Examiner—Leo P. Picard
Assistant Examiner—Anatoly Vortman
Attorney, Agent, or Firm—Hamilton, Brook, Smith & Reynolds, P.C.

[57] ABSTRACT

A portable computer has the features and benefits of a conventional portable computer and in addition including the added features of two larger than normal speakers, an integral microphone, a infrared transceiver and a touch-screen. The computer, also, has ports for receiving components tailored for disabled personnel including switching ports. The portable computer has a housing with an upper assembly and a lower assembly. The lower assembly has a support rib projects upward from the base and extends from one of the side walls towards the center of the lower assembly. One of the side walls has a reinforcing bar extending from generally the support rib to the front wall. A battery opening is defined by the reinforcing bar, one of the side walls and the front wall. The lower assembly defines a quadruplet of quadrants. The computer has a battery for powering the computer located in a quadrant, the battery quadrant. A hard drive and the power board are in the quadrant adjacent the battery quadrant. The battery engages the power board. A motherboard having a central processing unit is located in the quadrant opposite the battery quadrant. A human assist module overlays the motherboard. A CD-ROM is located in the quadrant adjacent the battery quadrant, with the support rib interposed between the two quadrants. The upper assembly has a display opening. A liquid crystal display may be seen through the display opening. A touchscreen is interposed between the liquid crystal display and the display opening.

15 Claims, 15 Drawing Sheets

U.S. PATENT DOCUMENTS

| | | | |
|---|---|---|---|
| 4,651,145 | 3/1987 | Sutter | 340/706 |
| 4,706,067 | 11/1987 | Hauck | 340/365 R |
| 4,779,079 | 10/1988 | Hauck | 340/706 |
| 5,045,842 | 9/1991 | Galvin | 340/709 |
| 5,142,655 | 8/1992 | Drumm | 379/52 |
| 5,220,652 | 6/1993 | Rowley | 395/275 |
| 5,289,342 | 2/1994 | Spalding et al. | 361/699 |
| 5,311,210 | 5/1994 | O'Brien et al. | 345/168 |
| 5,345,226 | 9/1994 | Rice, Jr. et al. | 340/825.19 |
| 5,426,450 | 6/1995 | Drumm | 345/168 |
| 5,426,564 | 6/1995 | Hsu | 361/707 |
| 5,481,616 | 1/1996 | Freadman | 381/90 |
| 5,557,500 | 9/1996 | Baucom et al. | 361/687 |
| 5,625,227 | 4/1997 | Estes et al. | 257/712 |
| 5,686,942 | 11/1997 | Ball | 345/158 |
| 5,889,510 | 3/1999 | Klarlund | 345/168 |

FOREIGN PATENT DOCUMENTS

| | | | |
|---|---|---|---|
| 410124243 | 5/1998 | Japan | G06F 3/033 |
| 410143304 | 5/1998 | Japan | G06F 3/02 |

OTHER PUBLICATIONS

DynaMyte 3100 with DSS Augmentative Communication Device http://www.sentient–sys.com/09%20DMyte3100.folder/DynaMyte3100.html (visited Dec. 16, 1998).

DynaVox 3100 with DSS Augmentative Communication Device http://www.sentient–sys.com/10%20DVox%203100.folder/10%20DynaVox%203100.html (visited Dec. 16, 1998).

Words+, Inc., Infrared/Sound/Touch (IST) Switch http://www.words–plus.com/ist.htm (visited Dec. 16, 1998).

UNIVERSALLY ACCESSIBLE PORTABLE COMPUTER

RELATED APPLICATION(S)

This application is a continuation of U.S. Ser. No. 08/944,160 filed on Oct. 6, 1997, abandoned, which claims priority to U.S. provisional application Ser. No. 06/054,904 which was filed on Aug. 5, 1997, the entire teachings of which are incorporated herein by reference. This application incorporates by reference U.S. provisional application Ser. No. 60/061,162 which was filed on even date of Oct. 6, 1997, titled "Universally Accessible Computer System" listing Howard C. Shane, James Lewis, Gregory Gardner Baker, Brent Koeppel, Paul Baxter, Bruce Leban, Dorothy Fitch, Ray Greer, Daniel K. Harden, Ian J. Myles, Garry Ming Heng Goh, Matthew A. Herron, John L. Groff, John Daniell Hebert, Gordon M. Fair, III, Rex Lundgren, Baldo Faieta, Henrik Thurfjell and Eric T. Brewer as inventors and having an Attorney Docket Number of ATE97-01p2, the entire teachings of which are incorporated herein by reference.

BACKGROUND OF THE INVENTION

As society continues to become more mobile, there has been a desire or requirement to be able to accomplish functions away from home or the office. The portable or laptop computer filled a need, by allowing persons to complete tasks, such as word processing, preparing presentations, communicating via electronic mail, and analyzing data, while away from home or the office. These devices are designed and suited for the general populist.

With the increasing desire to be more mobile, electronic organizers exist, which while not general purpose computers, allow the storage and retrieval of information. Some of these electronic organizers do not have conventional keyboards or keypad, but rather have a touch screen which overlies the display.

As society in general has become more mobile, large portion of those persons with a disability are likewise becoming more mobile either by desire or necessity. While examples of the above devices exists for persons with certain disabilities, the devices do not suit all disabilities or include features which persons with certain disabilities would desire. In addition, the devices do not suit ideal children or include features which some children would desire.

One type of device which is designed for a certain disability is the augmentive communication device for non-speaking individuals. These devices have a syntheized voice which allows the user to communicate verbally. Certain of these devices have a touch screen in which the person touches the screen to create or select sentences or phrases. Other methods of creating or selecting sentences or phrases include mouse-compatible inputs for selecting or scanning where the person indicates the proper choice as the device moves through a limited number of choices in a set order.

Certain augmentive communication devices even allow the recording of sounds in a digitized form for rebroadcasting. Another feature of some of these augmentive communication devices is an infrared transmitter in the device to allow the person to access and operate televisions and VCRs similar to conventional remotes. Infrared controls on some augmentive communication devices are capable of controlling computers and other appliances including lamps.

SUMMARY OF THE INVENTION

The invention relates generally to a portable computer having the features and benefits of a conventional portable computer, but in addition including the added features of two larger than normal speakers, an integral microphone, a infrared transceiver and a touchscreen. Furthermore, the computer has ports for receiving components tailored for disabled personnel including switching ports.

The portable computer has all these feature while making the computer both portable. This is accomplish by a novel arrangement of the components.

The portable computer has a housing with an upper assembly and a lower assembly. The lower assembly has a support rib projects upward from the base and extends from one of the side walls towards the center of the lower assembly. One of the side walls has a reinforcing bar extending from generally the support rib to the front wall. A battery opening is defined by the reinforcing bar, one of the side walls and the front wall. The lower assembly defines a quadruplet of quadrants with the support rib defining a boundary between two quadrants. The computer has a battery for powering the computer located in the battery quadrant, the quadrant with the battery opening. A hard drive and the power board are in the quadrant adjacent the battery quadrant. The battery engages the power board. A motherboard having a central processing unit is located in the quadrant opposite the battery quadrant. A human assist module overlays the motherboard. A CD-ROM is located in the quadrant adjacent the battery quadrant, with the support rib interposed between the two quadrants.

The upper assembly has a display opening. A liquid crystal display may be seen through the display opening. A touchscreen is interposed between the liquid crystal display and the display opening.

BRIEF DESCRIPTION OF THE DRAWINGS

For the purpose of illustrating the invention, the drawings are of forms which are presently preferred; it being understood, however, that this invention is not limited to the precise arrangement and instrumentality shown.

DESCRIPTION OF THE INVENTION

Figure 1:
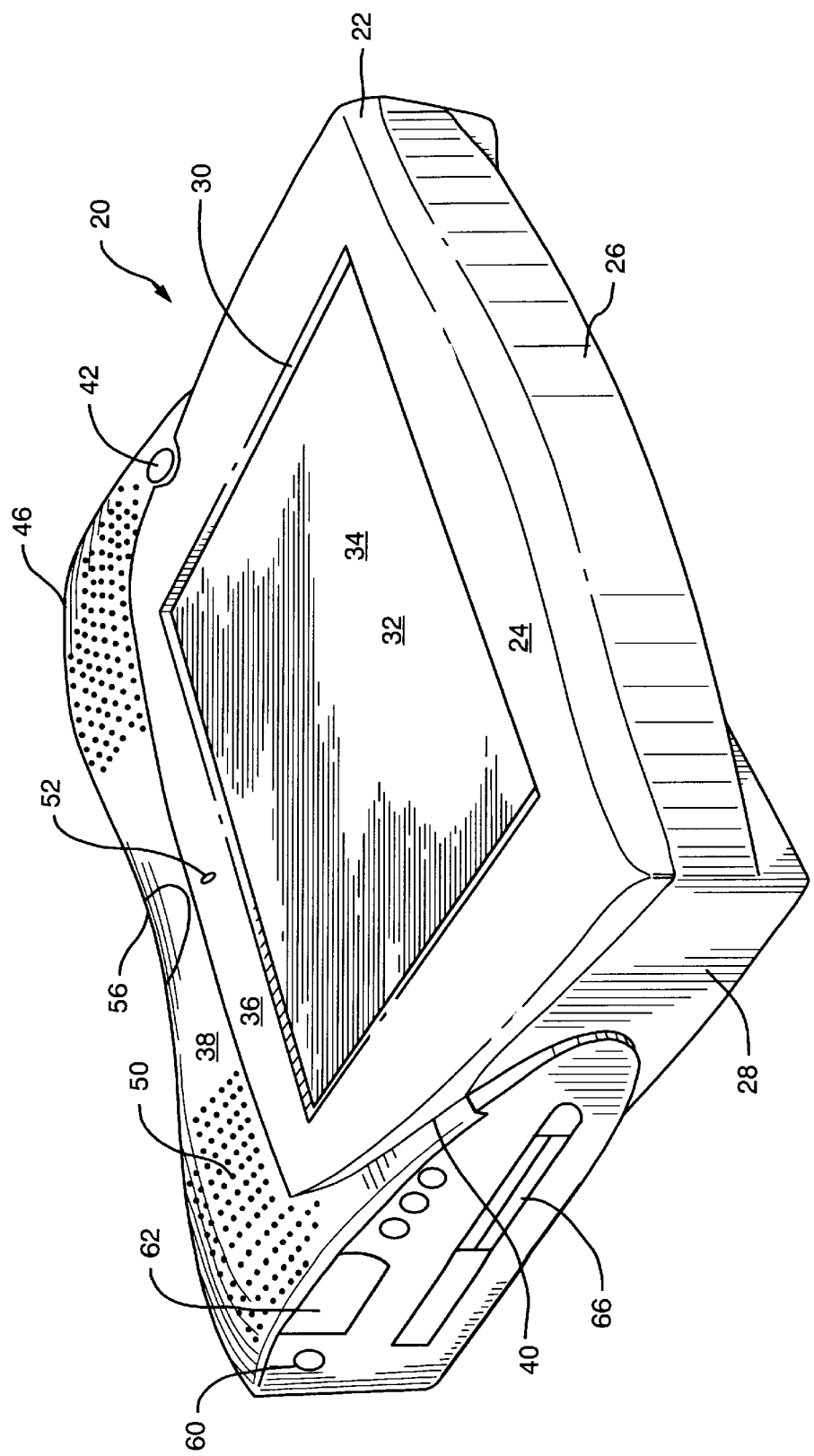
FIG. 1 is a perspective view of a universally accessible portable computer according to this invention.

Referring to the drawings in detail, wherein like numerals indicate like elements and where primes indicate counterparts of such like elements, there is illustrated a universally accessible portable computer 20 in accordance with the present invention. In accordance with a preferred embodiment of the invention, the computer is a tablet computer. A particular preferred embodiment is commercially available from Assistive Technology, Inc. of Chestnut Hill, Mass. as the Freestyle computer.

Referring to FIG. 1, the universally accessible portable computer 20 has a housing 22 which is generally a rectangular box shape. A top face 24, a front surface 26 and one of the side surfaces, the left side surface 28 of the housing 22, are seen in FIG. 1.

The top face 24 has a display opening 30 for viewing a display 32 located in the housing 22. A touch screen 34 overlies the display 32. The touch screen 34 is a transparent membrane which has two layers which when in contact indicate a relative location on the display 32.

The top face 24 has an upper central region 36 which borders the display opening 30. A lower region 38 of the top face 24 borders the upper central region 36 on the upper edge and portions of the left and right sides of the upper central region 36. The juncture of the upper central region 36 and the lower region 38 form a ridge 40. The ridge 40 on the left and right side form a comfortable place to place one's thumbs if the user is holding the portable computer 20.

On one side, the right in FIG. 1, is a power button 42 for turning on or off the portable computer 20. The power button 42 is located along the ridge 40. The upper central region 36 has a curved cut-out portion such that the power button is generally centered along the ridge line. The top of the power or "on" button is below the level of the upper central region 36, so that the button 42 will not accidentally be hit. The button 42 extends through a hole in the housing. It should be noted that the computer 20 can turn itself off without use of the "power button 42.

Figure 10:
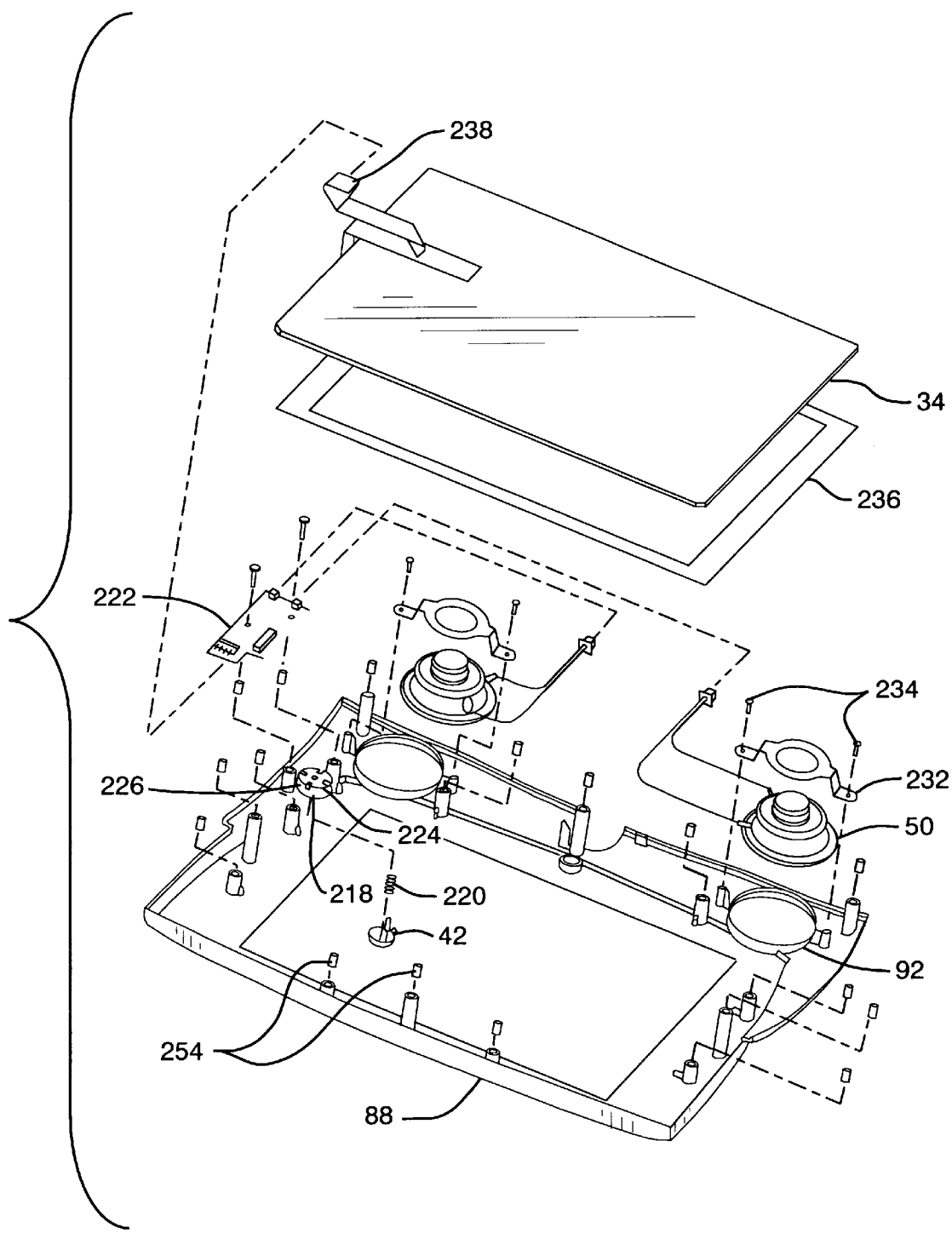
FIG. 10 is an exploded perspective view of the upper assembly with several of the components.

The lower region 38 of the top face 24 has a series of dimples 46 on the left and right sides and generally the portion above the upper central region 36. In a central region of both the dimples 46 on the left side and those on the right side, the dimples 46 extend through the housing 22 and form a region of openings or holes 48. Underlying the open region 48 in the housing 22 is a speaker 50, as seen in FIG. 10, on both the right side and the left side of the upper lower region 38. The open region 48 allow the sound to pass through the housing easily.

Figure 2:
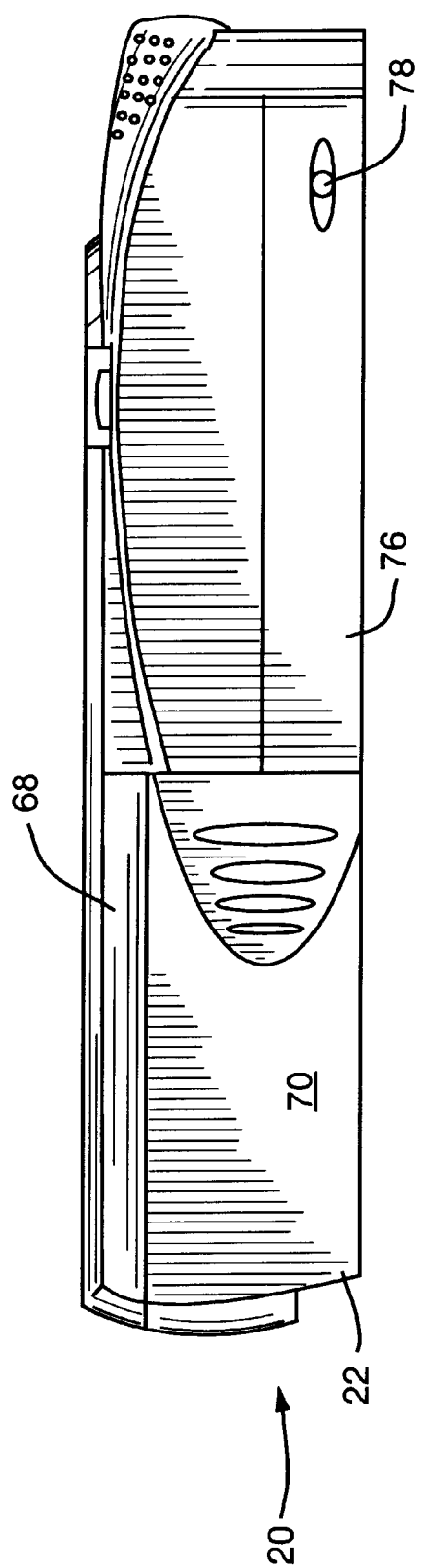
FIG. 2 is a right side view of the universally accessible portable computer.

The lower region 38 in both the upper right hand corner and the upper left hand corner slopes downward; the sloping of the right hand corner is best seen in FIG. 2.

Referring back to FIG. 1, the upper central region 36 has a small opening located between the display opening 30 and the upper lower region 38. The small opening 52 allows sounds to pass to a microphone which underlies the housing 22.

Figure 3:
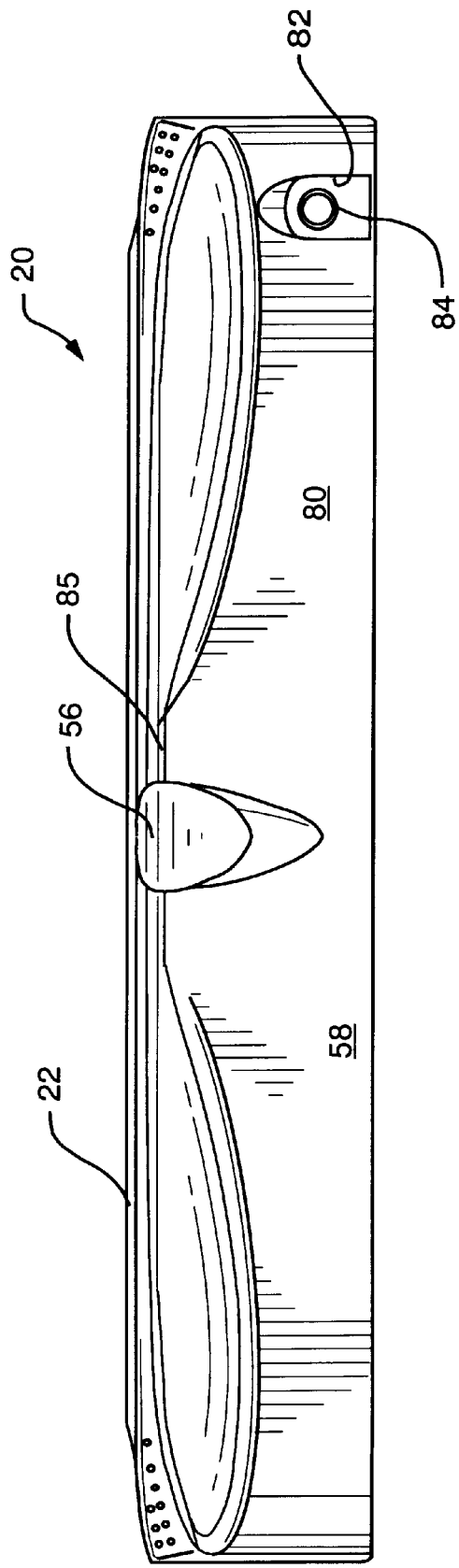
FIG. 3 is a back view of the universally accessible portable computer.

The top face 24 in addition has an infrared transparent lens 56 interposed between the two dimple areas 46 of the lower region 38. The lens 56 depends down the back 58 of the housing 22 as seen in FIG. 3. The universally accessible portable computer 20 has an infrared transceiver within the housing to allow the computer 20 to control items as described below.

Referring back to FIG. 1, the left side 28 of the housing 22 has a series of openings 60 and a flap 62 which covers a port for an external floppy drive. Below the openings 60 is a door 66 for a PCMCIA driver. The door 66 is slightly recessed from the surface. Because of the recess, the sides approaching the door 66 are tapered.

The right side 68 of the housing 22 as seen in FIG. 2 has a battery door 70 for accessing a rechargeable battery. In addition, the computer 20 has a CD-ROM 72 with a CD-ROM door 76 with an opening button 78.

FIG. 3 shows the back 58 of the housing 22 of the computer 20. In addition to the transparent lens 56, the back 58 has a door 80 for accessing several ports, as described below. In addition, there is an opening 82 to a power jack 84 for powering the computer 20 from an electrical outlet. The center portion of the back 58 near the top face 24, the location of the lens 56, does not project outward as the back does near the edges. This lack of projection forms a recess 85 to grab with one's hand for carrying under the arm.

Figure 4:
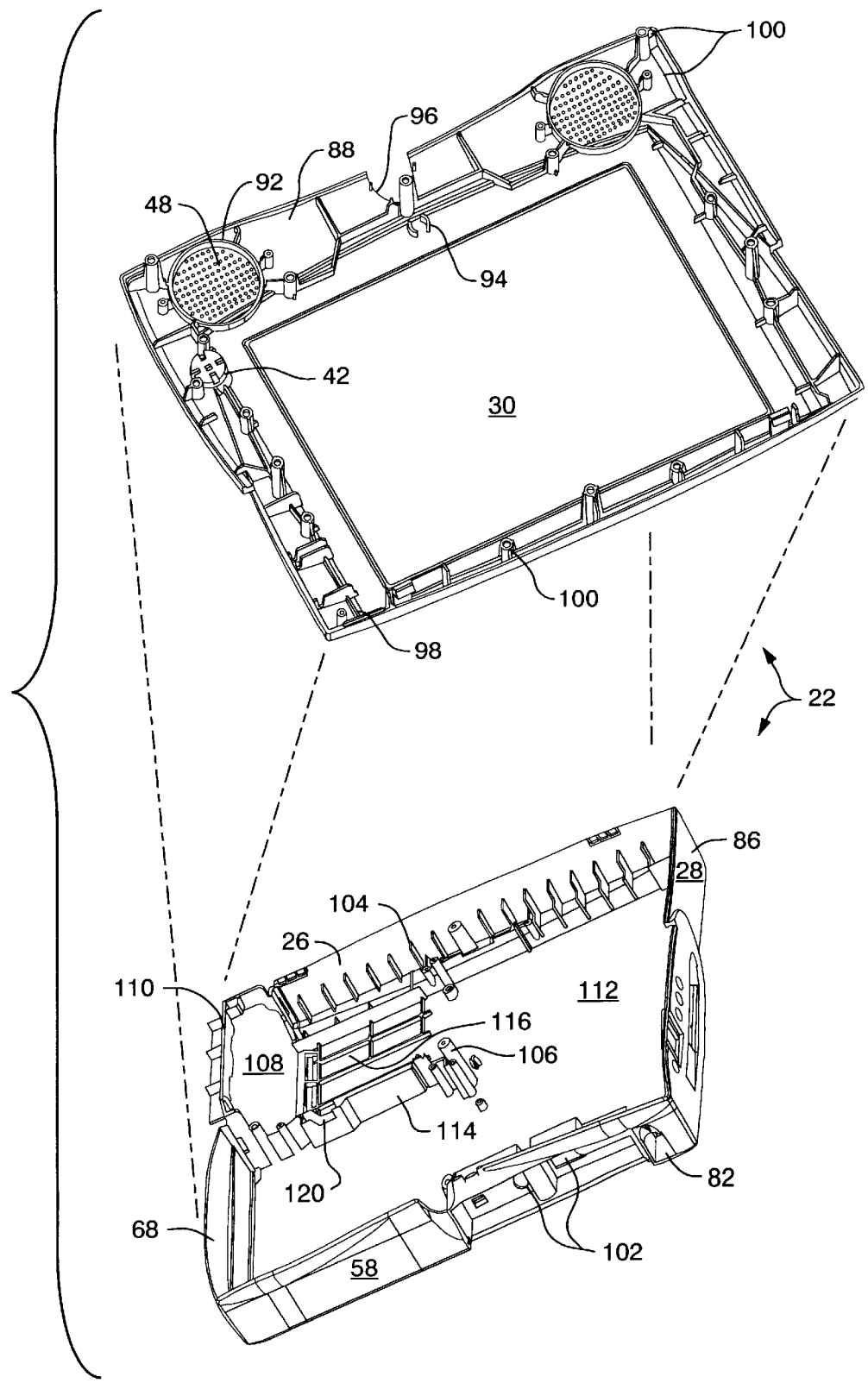
FIG. 4 is an exploded back perspective view of a lower assembly and an upper assembly of a housing of the universally accessible portable computer according to this invention.

Referring to FIGS. 4, the housing 22 is formed of two major components, a lower assembly or base 86, and an upper assembly or bezel 88. The housing 22 is shown in an exploded view from the rear in FIG. 2

The underside of the upper assembly 88 is shown. The upper assembly 88 has the opening 30 for the display. The power or "on" button 42 is shown on the left side of the FIG. The holes 48 for allowing the sound to pass from the speakers are surrounded by circular ribs 92. The small opening 42 for allowing sound to reach the microphone has a pair of semi-circular ribs 94 to retain the microphone. A parabolic slot 96 is located between the speaker openings for the lens 56, shown in FIG. 1.

The upper assembly 88 has a series of ribs 98 for reinforcing and stiffening. The assembly 88, in addition has a plurality of threaded tubes 100 for receiving fasteners. The threaded feature of the tubes could be provided by an insert which is retained in the tube. Some of the fasteners are used to secure components to the upper assembly. Other fasteners extend between the assemblies 86 and 88 to hold the housing 22 together.

Still referring to FIG. 4, in addition to the series of openings 60 and the door 66 on the left side 28, the lower assembly 86 has a plurality of port openings 102 on the rear or back surface 58. The openings 102 were hidden by the door 80 in FIG. 3.

The lower assembly 86, similar to the upper assembly 88, has a series of ribs 104 and a plurality of tubes 106. The ribs 104 in the lower assembly 86 project upward adjacent to the front wall 26, the rear as seen in FIG. 4. The tubes 106 allow a fastener to enter from the bottom and extend through to the upper assembly or are threaded to receive fasteners from above to retain components to the lower assembly 86.

A large battery opening 108 is located on a right side, the left side in the FIG. The opening 108 is defined by a reinforcing bar extending 110 over the opening 108 in addition to the base 112 and front wall 26 and the right side wall 68 of the housing 22.

A battery wall support rib 114 extends from the edge of the opening 108 at the side wall 68 to approximately the center of the lower assembly 86 and extends from the base 112 to about half the height of the lower assembly 86. The rib 114 in conjunction with the base 112 and the front wall 26 defines a battery receiving compartment or battery quadrant 116.

Figure 5:
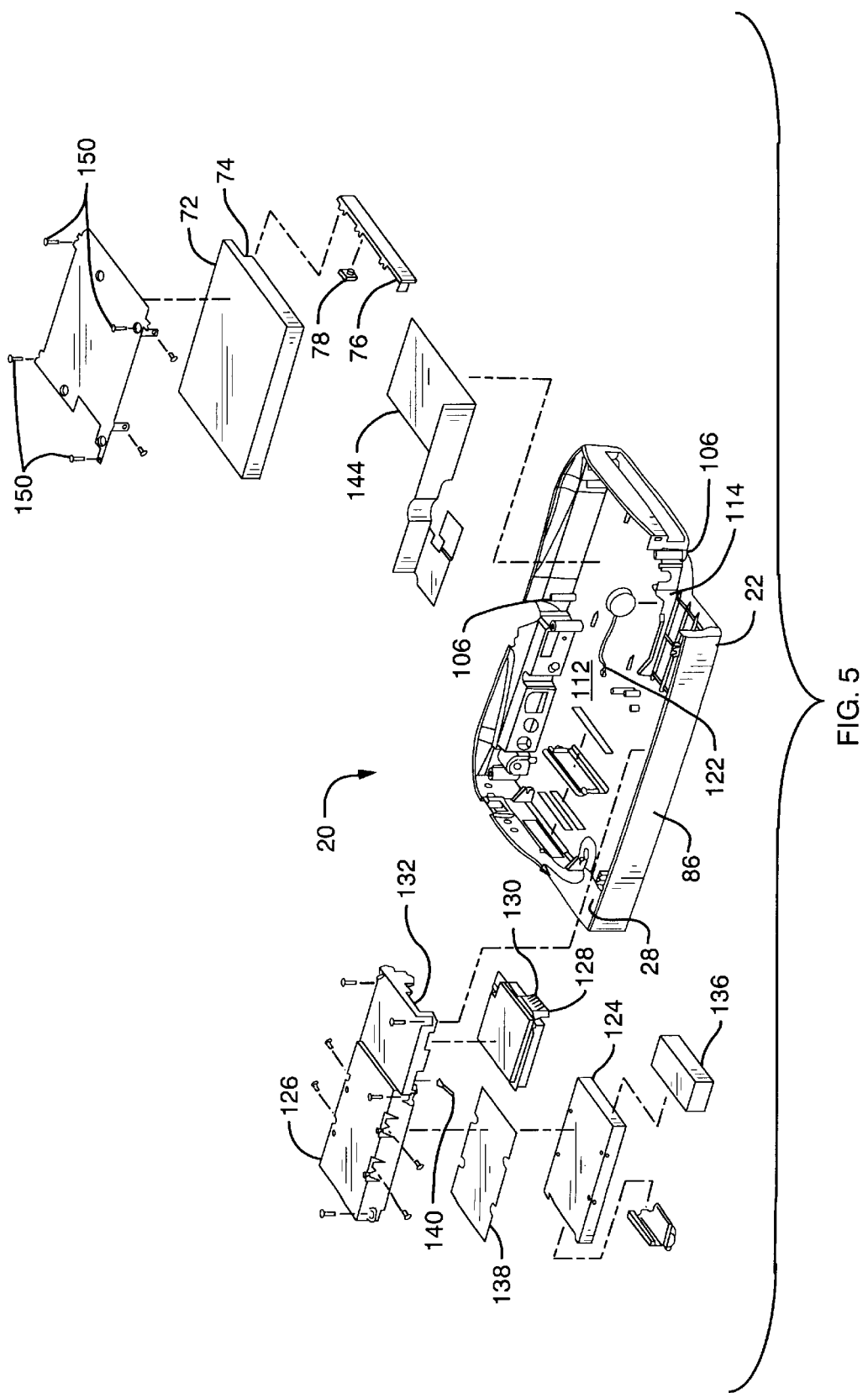
FIG. 5 is an exploded perspective of the lower assembly with several of the components.

The battery wall support rib 114 splits into two sections defining a central opening 120 for receiving a backup battery 122, shown in FIG. 5.

The computer has numerous components, which are described below, which are packaged into the housing 22 to allow the computer 20 to accomplish all the desired functions. The components are secured to the lower assembly or housing 86 or the upper assembly or housing 88, prior to the assemblies 86 and 88 being joined together.

A perspective view of the lower assembly 86 with a portion of the components it receives are shown in FIG. 5. The computer 20 has a two devices for accessing/stored programs and data: a hard drive 124 and the CD-ROM 72. A floppy disk drive can be attached by a cable to a port behind the flap 62 on the left side 28, but is not contained within the housing 22.

Figure 13:
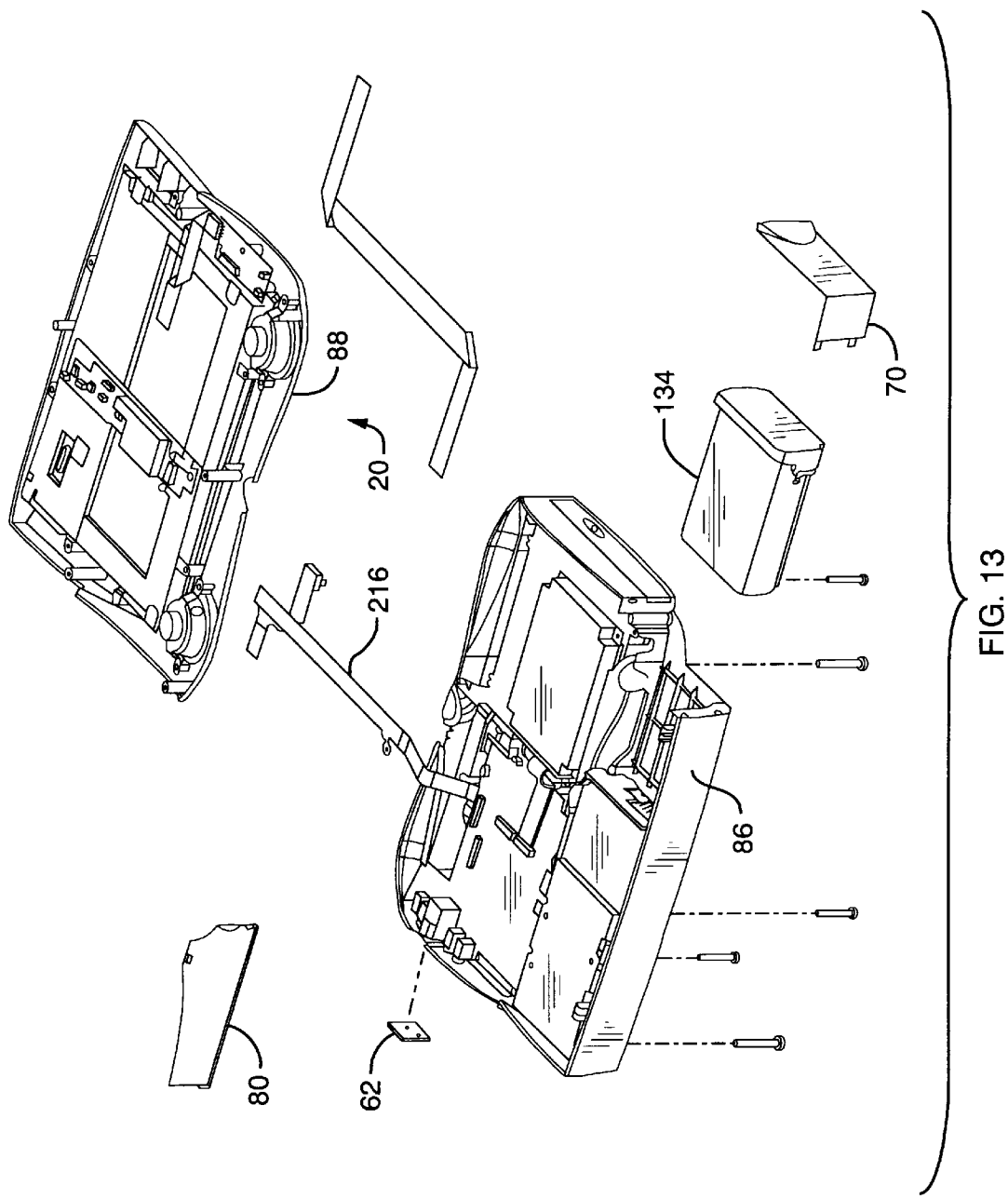
FIG. 13 is a exploded perspective view of the lower assembly and the upper assembly of the housing with their respective components installed.

The hard drive 124 is located in the front left corner or quadrant of the lower assembly 86. The hard drive 124 is sandwiched between the bottom or base 112 of the lower assembly 86 and a frame, a hard drive frame 126. The hard drive frame 126, in addition, holds a power board or power supply 128. The power board 128 has a series of terminals 130 that extend through an opening 132 in the frame 126, for engaging a rechargeable battery 134, as seen in FIG. 13.

Located in the hard drive frame 126 with the hard drive 124 is a pair of shields 136 and 138 to reduce the amount of EM (electromagnetic) interference the hard drive 124 receives from other components and wiring in the housing 22. The shield 136 between the hard drive and the power board is a copper shield 136. The other shield 138, which is not require to reduce as much interference, is a polyester shield 138.

There is a spring 140 interposed between the hard drive frame 126 and the polyester shield 138. The spring 140 is connected to the hard drive frame 126 and allows slight movement of the hard drive 124 relative to the hard drive frame 126.

Located in the corner or quadrant opposite the hard drive 124 is the CD-ROM 72. Below the CD-ROM 72 in the rear right corner is a copper heat sink 144. The heat sink 144 is a plate folded to conform to the space. The heat sink 144 underlies the CD-ROM 72 and in addition underlies the power board 128. The heat sink 144 is shown in phantom in the installed position.

The CD-ROM 72 has the CD-ROM drive 74 with a door 76 and opening button 78. The CD-ROM 72 also has a bracket 146 which holds the CD-ROM drive 74 with a series of screws 148. The CD-ROM bracket 146 is secured to several of the post or tubes 106 projecting from the base 112 of the lower assembly 86 by screws 150.

The back-up battery 122 is retained in the central opening 120 defined by the central rib, the battery wall support rib 114. The back-up battery 122 maintains power to the clock and the firmware, when the computer 20 is not on.

Figure 6:
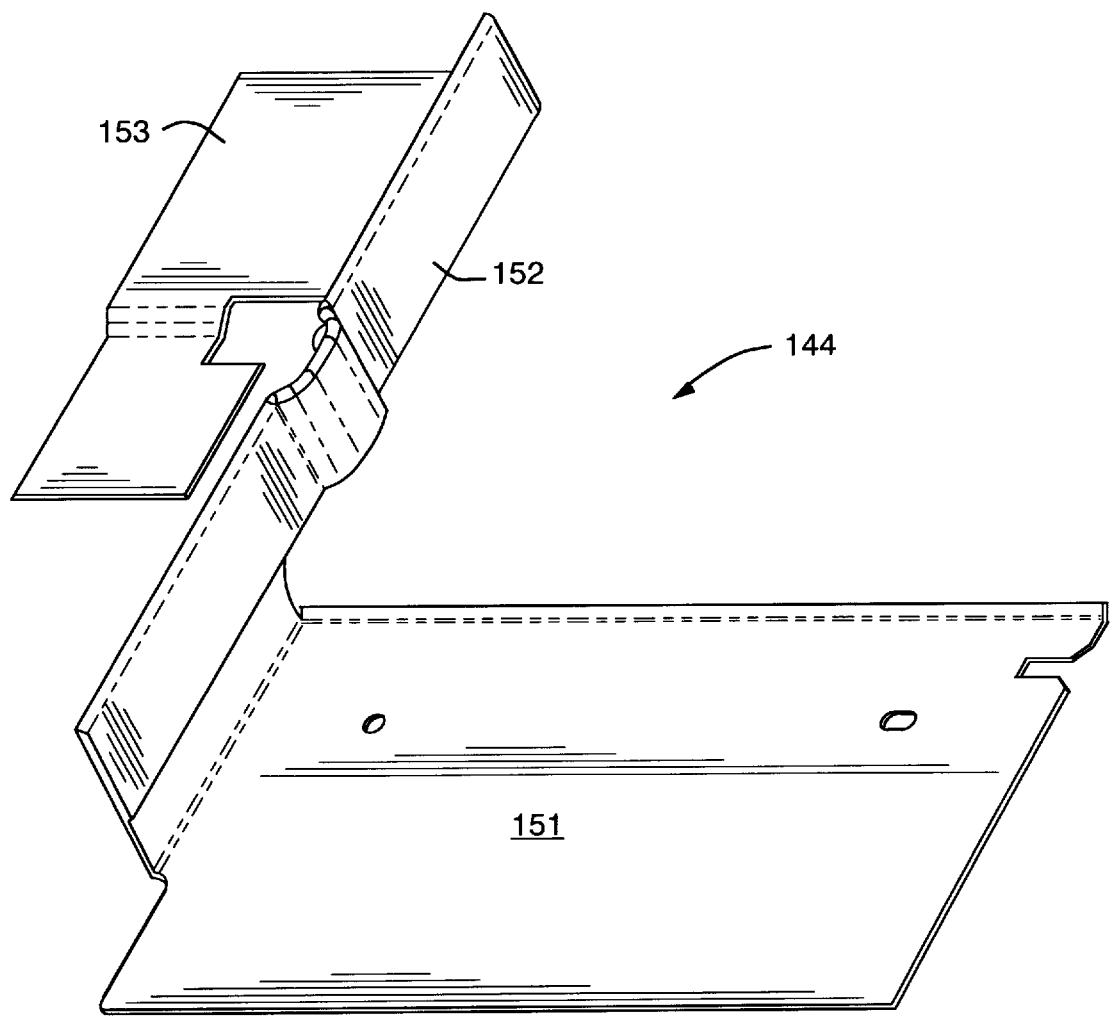
FIG. 6 is a perspective view of a heat sink.
Figure 7:
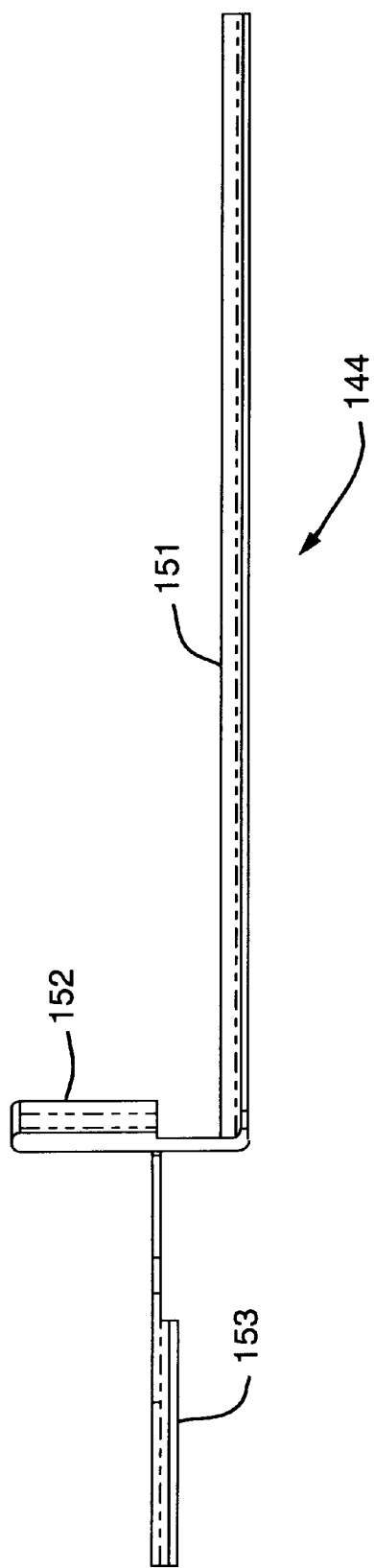
FIG. 7 is a front view of the heat sink.

FIGS. 6 and 7 show the heat sink 144. The heat sink includes a planar portion 151, a runner portion 152 and a raised planar portion 153. The planar portion 151 underlies the CD-ROM 72. The runner portion 152 is generally vertical and extends between the planar portion and the raised planar portion. The runner portion 152 has a curved section to circumvent the tubes 106 and positioning feet which project from the bottom 112 of the lower assembly 86. The raised planar portion 153 underlies the power board 28.

Figure 8:
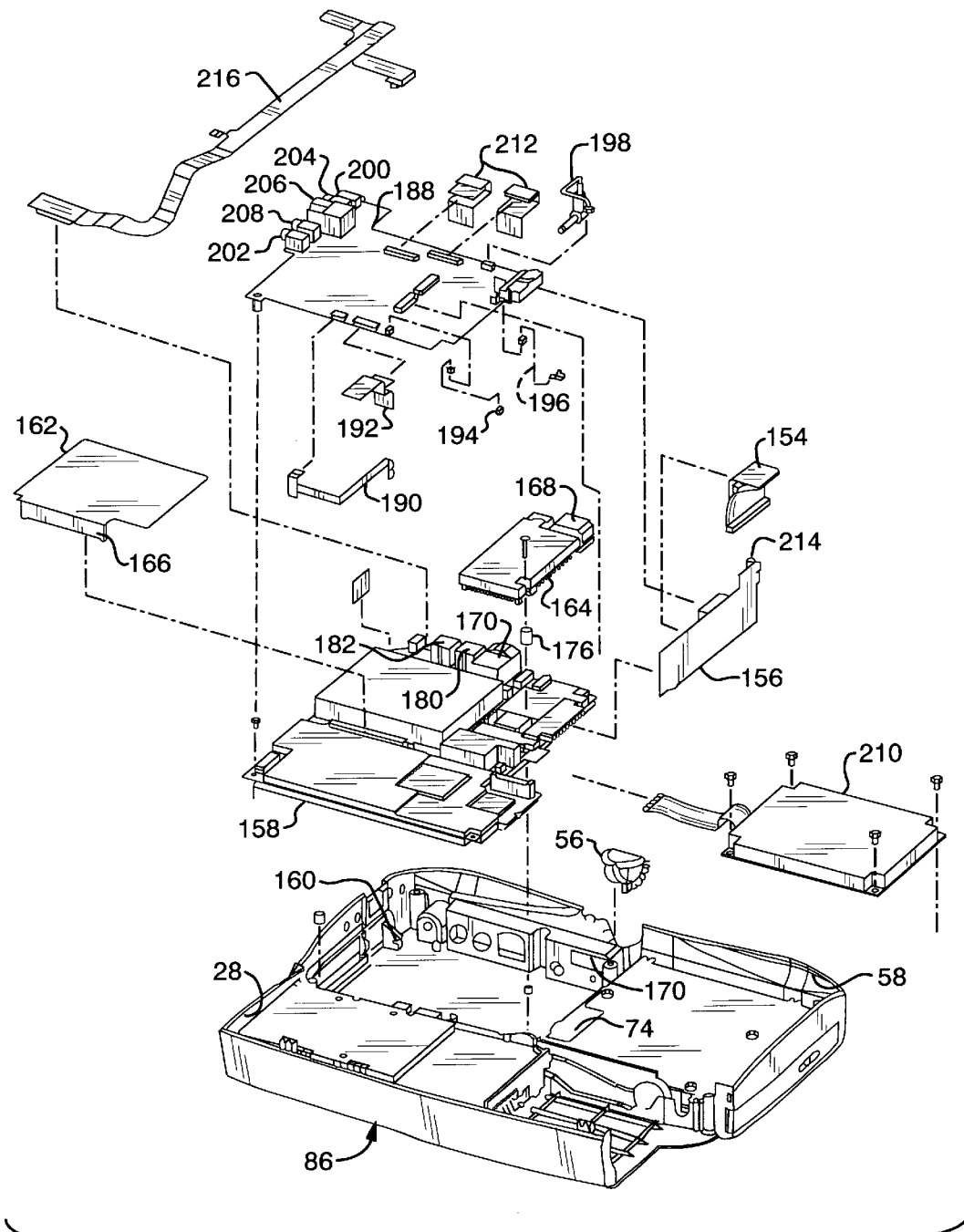
FIG. 8 is a perspective of the lower assembly with the components of FIG. 5 installed and other components exploded away.

The lower assembly 86 with the components described above with respect to FIG. 5 installed is illustrated in FIG. 8. A cable 154, a media flex, connects to the CD-ROM drive 74 and a board, a back plane board 156. The back plane board 156 is connected to a motherboard 158.

The motherboard 158 is located in the left rear corner of the lower assembly 86. The motherboard 158 is positioned by a pair of slots 160 which open sideways, as seen best in FIG. 5, from the left side 28 of the lower assembly 86. The motherboard 158 in a preferred embodiment is a standard Apple Powerbook motherboard with a 100 MHz processor.

In addition to the back plane board 156, a memory board 162 and a video board 164 are attached to the motherboard 158. The memory board 162 is connected with a connector 166 which is attached to the center of the top surface of the motherboard 158 and the memory board 162 is generally parallel with the motherboard 158.

The video board 164 overlies the right rear corner of the motherboard 158, and the connection of the back plane board 156 to the motherboard 158. The video board 164 is connected to the motherboard 154 at the bottom forward edge of the video board 164. The video board 164 has at its rear edge a port 168 for connecting another display separate from the display located in the housing 22 of the universally accessible portable computer 20. The port 168 is accessible through an opening 170 in the rear wall 58 of the lower assembly 86.

In addition to the video board 164, the motherboard 158 has a series of connectors 172 which are accessible through other openings 174 in the rear wall 58 of the lower assembly 86. These connectors 172 include an audio in jack 176, a SCSI 178, a serial port 180, and an Apple Data Bus (ADB) port 182. The motherboard 158 also has a reset button, graphically represented as 184 in FIG. 9, which is accessible through an opening the housing 22.

Overlying a majority of the motherboard 158 and also the memory board 162 and the video board 164, is a human assist module (HAM) board 188. The HAM board 188 is a board that adapts the conventional input and output interfaces ports that a computer would have, such as a mouse port, keyboard port and sound, and creates input ports and output ports that can be used by the disabled. A serial connector 190, an Apple Data Bus (ADB) connector 192 and a power connector 194 extend from the motherboard 158 to the HAM board 188. An CD audio connector 196 extends from the HAM board 188 to the back plane board 156; the back plane board 156 is connected to the CD-ROM drive 74. Another audio connection 198 extends from the HAM board 188 to the motherboard 158.

The HAM board 188 has a pair of audio jacks; one a headset jack 200, the other a speaker jack 202, which are accessible through the openings 60 on the left side wall 28 of the lower assembly 86. The HAM board 188 in addition has a pair of switch input ports 204 which are also accessible through the openings 60 in the left side wall 28. The switch input ports 204 each can receive two signals, which each can be on or off (i.e., each input port can have four positions represented in binary by 00, 01, 10, 11). These switch input ports 204, switch 1/2 and switch 3/4, can be used to connect input mechanisms for persons not capable of using the touch screen 34 or a conventional mouse or tracker ball. These types of input mechanisms are well known.

The HAM board 188 in addition has an input, a connection port 206, for connecting an external floppy disk drive. The connection port 206 for the floppy disk drive is located interposed between the input port 204 for the switch 1/2 and the switch 3/4. The connection port 206 is covered by the flap 62 as seen in FIG. 1.

The universally accessible computer 20 has a touchscreen controller 210. The touchscreen controller 210 is located in the rear right hand corner and secured to the CD-ROM bracket. The touchscreen controller 210 is connected to the HAM board 188. The HAM board 188 receives the signal from the touchscreen controller 210 and sends it to the motherboard 158 through a pair of keyboard connections 212.

The universally accessible computer 20 has an infrared control 214 for controlling appliances such as, for example, televisions, radios, coffee pots and lamps. The infrared control transceiver 214 is mounted on the back plane board 156. The lower assembly 86 has a cutout to receive the transparent lens 56 for the infrared control 214.

All of the components discussed above are located in the lower assembly 86. The lower assembly 86 is connected electronically to the upper assembly 88 by a flexible display cable 216. The flexible cable 216 is secured to the motherboard 158.

Figure 9A:
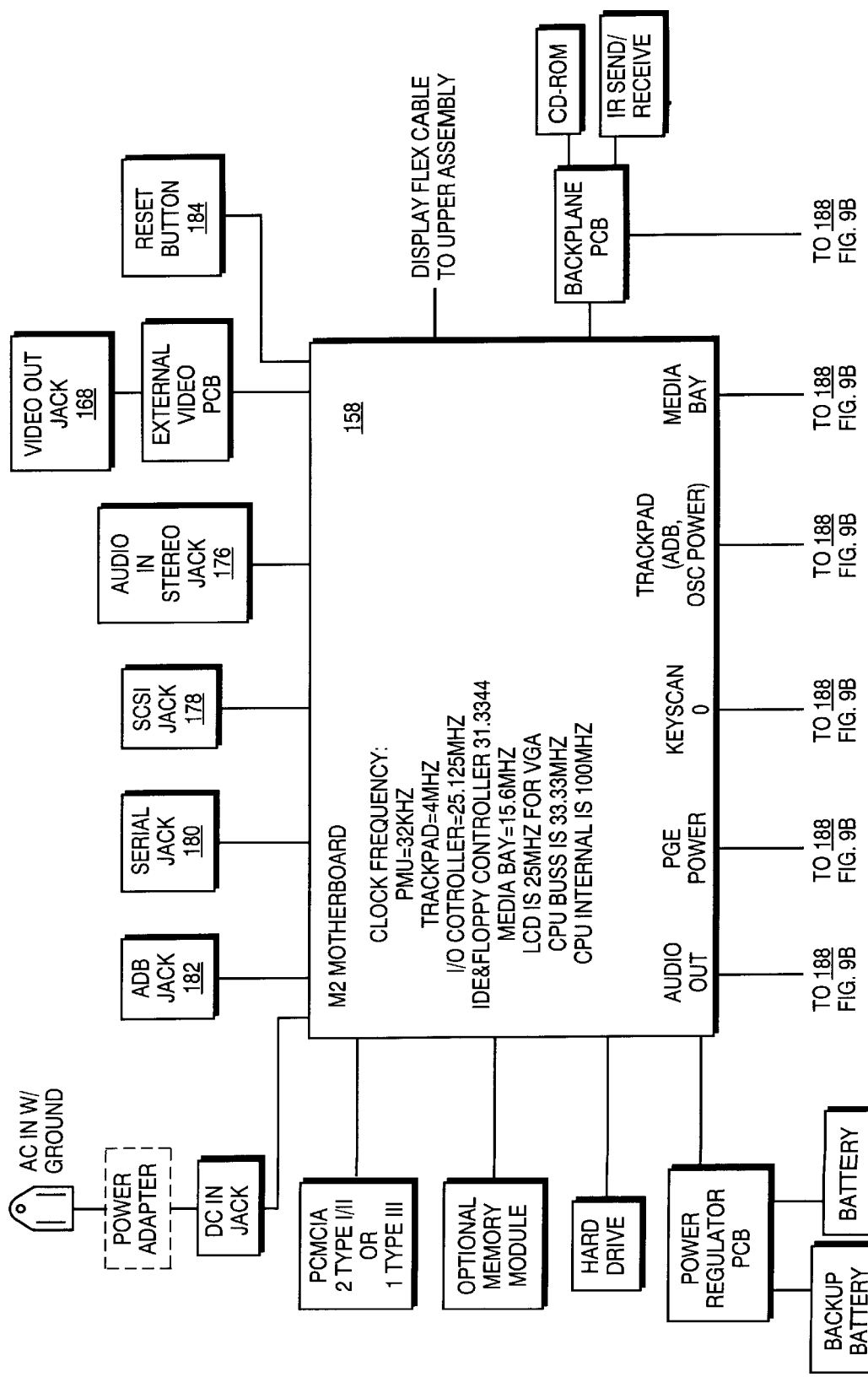
FIGS. 9A and 9B are a schematic of the connections of the components.
Figure 9B:
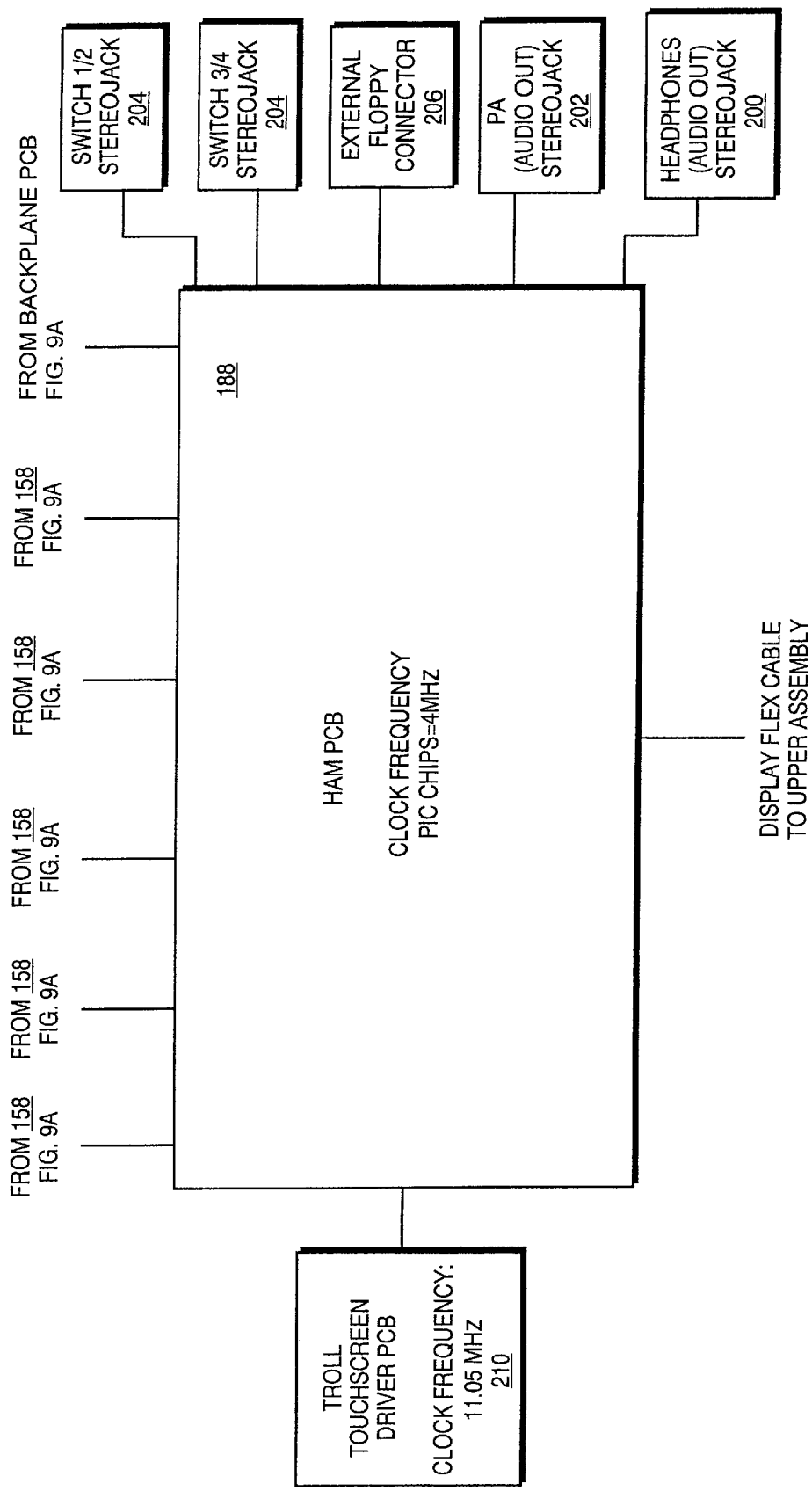

FIGS. 9A and 9B are a schematic of the components of the lower assembly and their interconnection. While the display flexible cable 216 connections to the motherboard 158, the HAM board 188 connects directly to components in the upper assembly 88, with the connects running through the motherboard 158.

A perspective view of the upper assembly 88 flipped upside down with a portion of the components it receives are shown in FIG. 8. The components located in the upper assembly 88 are limited to items that directly interface with the user and some of those components interfacing boards or cards.

The computer 20 has a power switch 218, located on the right side of the display opening 30, the left side in FIG. 8. The power switch 218 includes the "on" or power-on button 42, a spring 220 for biasing the button 42 to a raised position, in normal orientation of the computer 20, and a power-on printed circuit board (power-on PCB) 222. The power-on button 42 and spring 220 are located on the outside of the housing 22 in a recessed area 224. The recessed area 224 has a series of openings 226 which receives feet at the end of legs 228 on the power-on button 42 to retain the power-on button 42 and spring 220 in the recessed area 224. The power-on PCB 222 is mounted to the inside of the upper assembly 88.

The speakers 50 are mounted so the diaphragm underlies the holes 48 in the housing 22. As indicated above, the housing 22 has a series of dimples or depressions 46 on the outer surface of the lower region 30 of the top face 24. The central circular region of the dimples 46 extend all the way through the housing 22 forming the holes 48 for the sound of the speakers 50 to pass through. The speakers 50 are each located in a circular rib 92 and held in place by a speaker metal retainer 232 and a pair of screws 234.

The touchscreen 34 of the computer 20 is transparent and has at least two layers when brought into contact with each other by pressure such as someone's finger on the touchscreen 34 indicating the location on the grid, similar to moving a mouse and clicking a button. The touchscreen 34 is positioned so that it overlies the display opening 30 with a gasket 236 interposed as seen in FIG. 10. A ribbon cable 238 is attached to the touchscreen 34. The ribbon cable 238 attaches to the power-on PCB 222.

Figure 11:
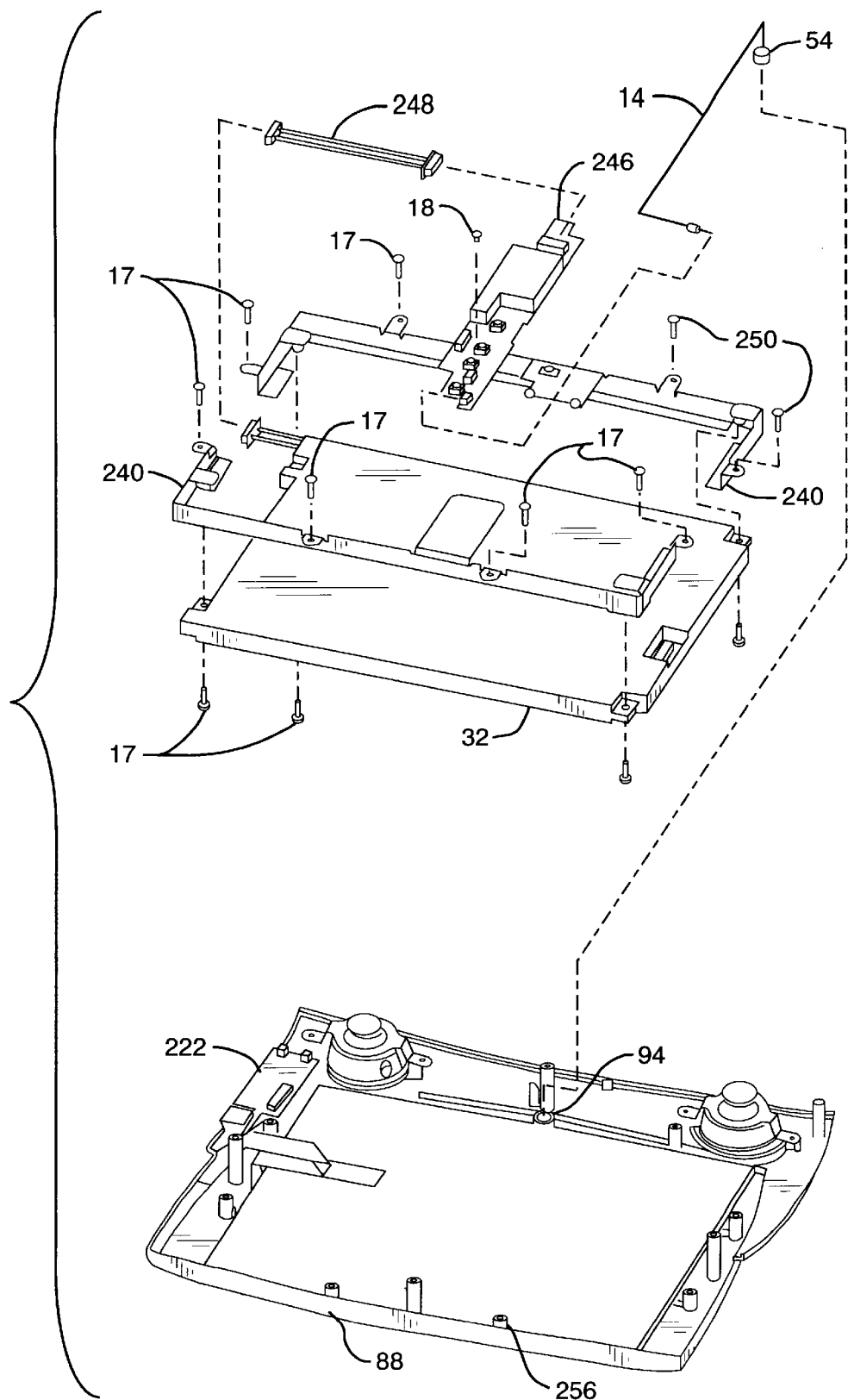
FIG. 11 is a perspective view of the upper assembly with the components of FIG. 10 installed and other components exploded away.

Referring to FIG. 11, the display 32, preferably a flat panel liquid crystal (LC) display, is held by a pair of display brackets 240. The LC display 32 includes circuitry to twist the liquid crystal and a backlight. The computer has an inverter PCB 246 mounted on the display brackets 240 and overlying the display 32 as seen in FIG. 11. The flat panel LC display 32 is connected to the inverter PCB 246 by an inverter jumper 248.

The display brackets 240 are secured to the upper assembly 88 by a plurality of screws 250 extending through holes 252 in the brackets 240 and received by threaded inserts 254 in posts 256 in the upper assembly 88. The microphone 54 is located in the semi-circular ribs 94 that project downward, upward in the FIG., in the upper assembly 88. The small opening 52, as seen in FIG. 1, allows the microphone 54 to gather sound from the computer's surrounding, such as voices, for storage and access by application programs. The microphone 54 is connected to the inverter PCB 246.

Figure 12:
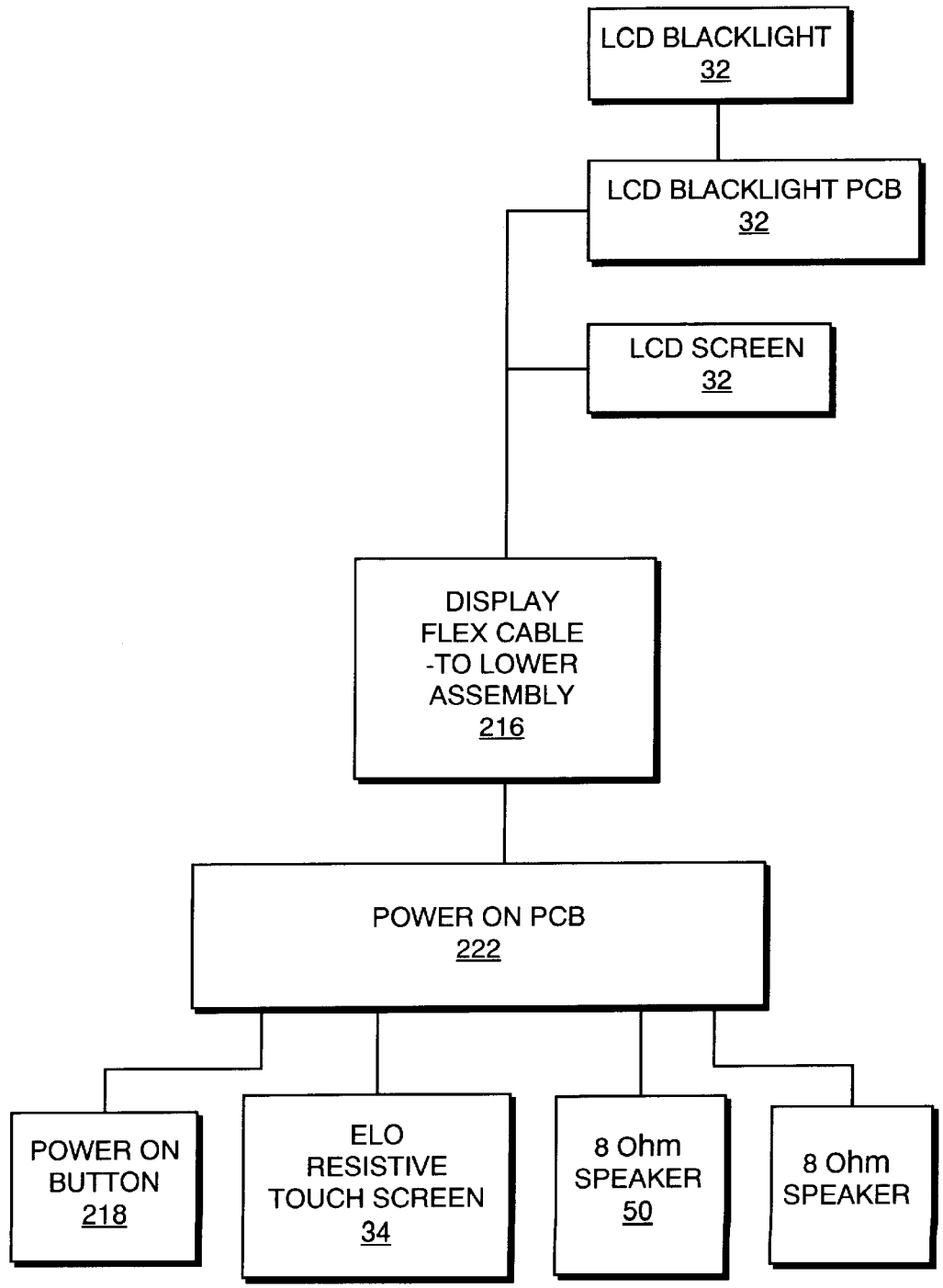
FIG. 12 is a schematic illustration of the connection of the components in the upper assembly.

FIG. 12 is a schematic of the components of the upper assembly 88 and their interconnection. As indicated with respect to FIG. 5, while the display flex cable connects the motherboard to the upper assembly, certain components are connected directly to the HAM PCB 188 on the lower assembly and others, such as the display 32, are connected to the motherboard.

The upper assembly 88 and lower 86 assembly are connected physical by a plurality of screws 260 that extend from the lower assembly 86 to posts 256 in the upper assembly 88. In a preferred embodiment, there are five screws extending between the assemblies 86 and 88.

The battery 134 which is received by the battery receiving compartment 116. The battery 134 is covered by the battery door or cover 70. In addition, the floppy cover and the door is shown.

Figure 14:
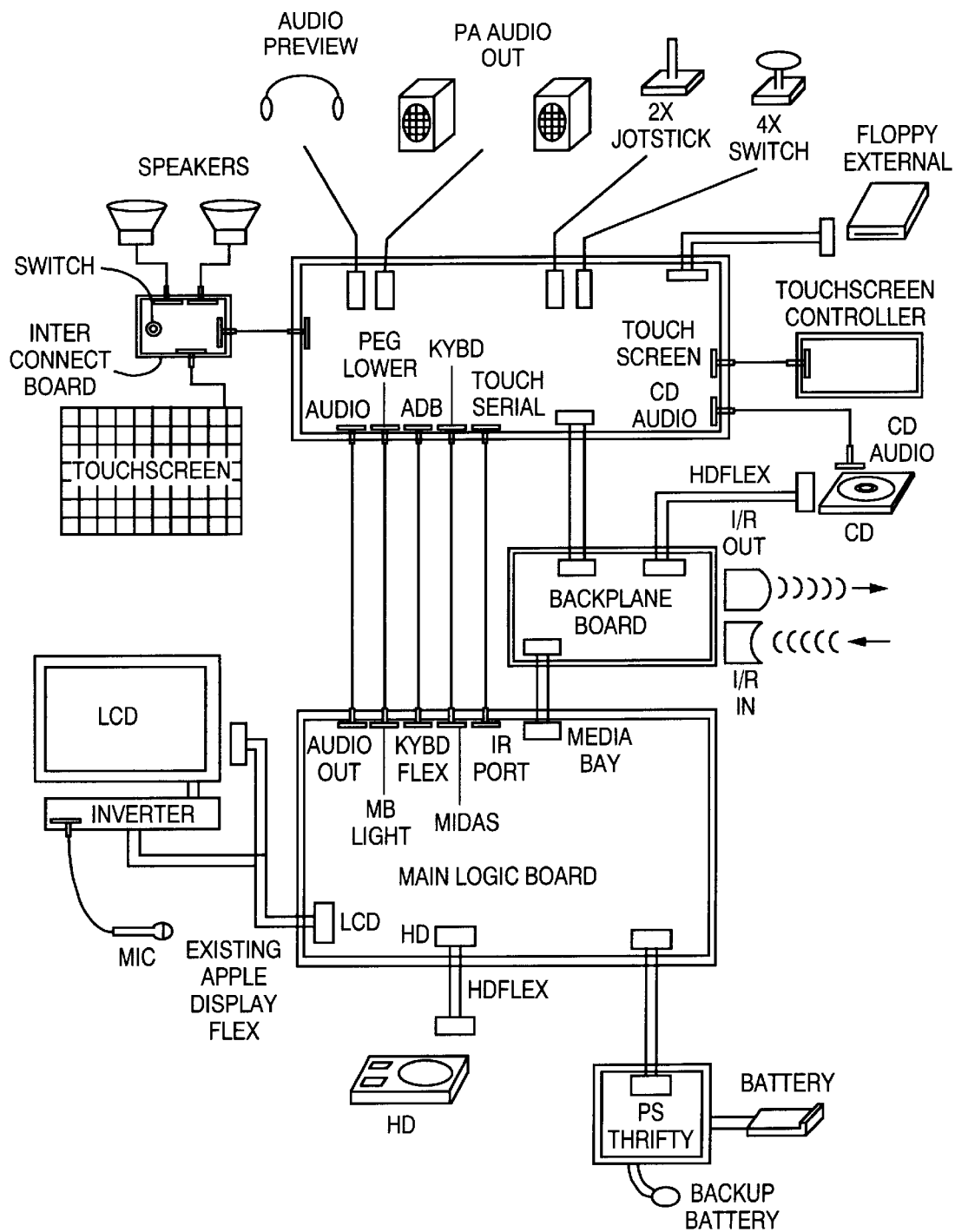
FIG. 14 is a schematic illustration of the connection of the components in the housing and their connections.

FIG. 14 is a schematic of all the components and their interconnection in the computer

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A portable computer comprising:
  a housing having an upper assembly and a lower assembly, the upper assembly having a display opening;
  a motherboard having a central processing unit located in the lower assembly;
  a hard drive located in the lower assembly;
  a CD-ROM located in the lower assembly;
  a battery for powering the computer, the battery receivable in the lower housing through an opening in the housing;
  a human assist module located in the lower housing;
  an infrared sender located in the lower housing;
  a liquid crystal display carried by the upper assembly such that the display may be seen through the display opening;
  a touchscreen interposed between the liquid crystal display and the display opening;
  a power-on circuit including a button accessible from the outside of the housing;
  a power board for interacting with the battery; and
  a copper heat sink, the heat sink having a planar portion to underlie the CD-ROM, a runner portion and a raised planar portion to overly the hard drive and the power board.

2. The computer of claim 1 further comprising a copper shield and a polyester shield, the copper shield and the polyester shield engaging the hard drive and at least one of the shields engaging the heat sink.

3. The computer of claim 1 wherein the human assist module includes a headset jack, a speaker jack, a pair of switch input ports wherein each input port is capable of receiving at least two binary signals.

4. A portable computer comprising:
   a housing having an upper assembly and a lower assembly;
   the lower assembly having a base, a front wall, a back wall and a pair of side walls, a support rib projecting upward from the base and extending from one of the side walls towards the center of the lower assembly, the one of the side walls having a reinforcing bar extending from the support rib to the front wall;
   the reinforcing bar, the one of the side walls and the front wall defining a battery opening in the one of the side walls;
   the lower assembly defining a quadruplet of quadrants with the support rib defining a boundary between two quadrants;
   a battery for powering the computer, the battery receivable in the quadrant of the housing, a battery quadrant, having the battery opening;
   a hard drive;
   a power board, both the hard drive and the power board located within the quadrant adjacent the battery quadrant, the battery engaging the power board;
   a motherboard having a central processing unit located within the quadrant opposite the battery quadrant;
   human assist module overlying the motherboard;
   a CD-ROM located in the quadrant adjacent the battery quadrant and alongside the interposed support rib;
   the upper assembly having a display opening;
   a liquid crystal display carried by the upper assembly such that the display may be seen through the display opening;
   a touchscreen interposed between the liquid crystal display and the display opening; and
   a power-on circuit including a button accessible from the outside of the housing.

5. The computer of claim 4, further comprising a touchscreen controller, the touchscreen controller located in the lower assembly of the housing and overlying the CD-ROM.

6. The portable computer of claim 5, further comprising a video card and a memory card, both the memory card and the video card overlying the motherboard and underlying the human assist module.

7. The portable computer of claim 5, further comprising a back plane card located in the housing between the CD-ROM and the motherboard, an infrared sender carried by the backplane card, and a transparent lens carried on the housing for allowing infrared rays to pass from the infrared sender.

8. The portable computer of claim 5, wherein the support rib splits into two section to define an opening and further comprising a backup battery carried in the opening.

9. The computer of claim 5 further comprising a pair of speakers and a microphone in the housing, the upper assembly of the housing having openings for allowing the sound to pass through the housing.

10. The computer of claim 4 further comprising a power board for interacting with the battery, a copper heat sink, and a pair of shields, the heat sink having a planar portion to underlie the CD-ROM, a runner portion and a raised planar portion to overly the hard drive and the power board, the shields engaging the hard drive and at least one of the shields engaging the heat sink.

11. The computer of claim 4 wherein the human assist module includes a headset jack, a speaker jack, a pair of switch input ports wherein each input port is capable of receiving at least two binary signals.

12. A housing for a portable computer comprising:
    the housing having a rectangular shaped housing, the housing comprising a top face, a front, a back, a pair of sides and a bottom;
    the top face having an opening for viewing a touch-screen display carried in the housing;
    the housing having a plurality of openings for allowing sound to pass through from at least one speaker in the housing and having at least one opening for allowing sound to pass through the housing to a microphone in the housing;
    the housing having an opening for receiving a translucent material, the translucent material covering a infrared sensor in the housing
    the housing having at least one opening for receiving an input device for controlling a pointer of the touch screen display; and
    the housing having a concave surface at an edge where the back surface and the top face join adapted to receive the palm of the user's hand and the top surface having a ridge adapted to receive the thumb of the user for carrying the portable computer.

13. A housing as in claim 12 wherein the front has a concave surface from side to side for the upper portion.

14. A housing as in claim 12 wherein the top has a pair of ridges, each of the ridges are located between the touch screen display and the pair of sides.

15. A housing as in claim 14 wherein the ridges between the pair of sides and the touch screen display narrow and descend as the ridges approach the front.

* * * * *